HARRY W. VERLINDEN
INVENTOR.

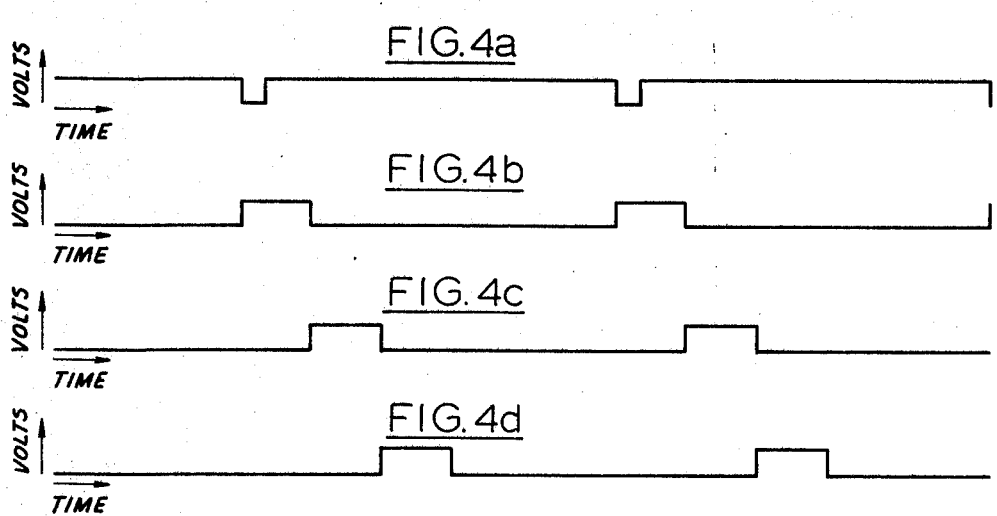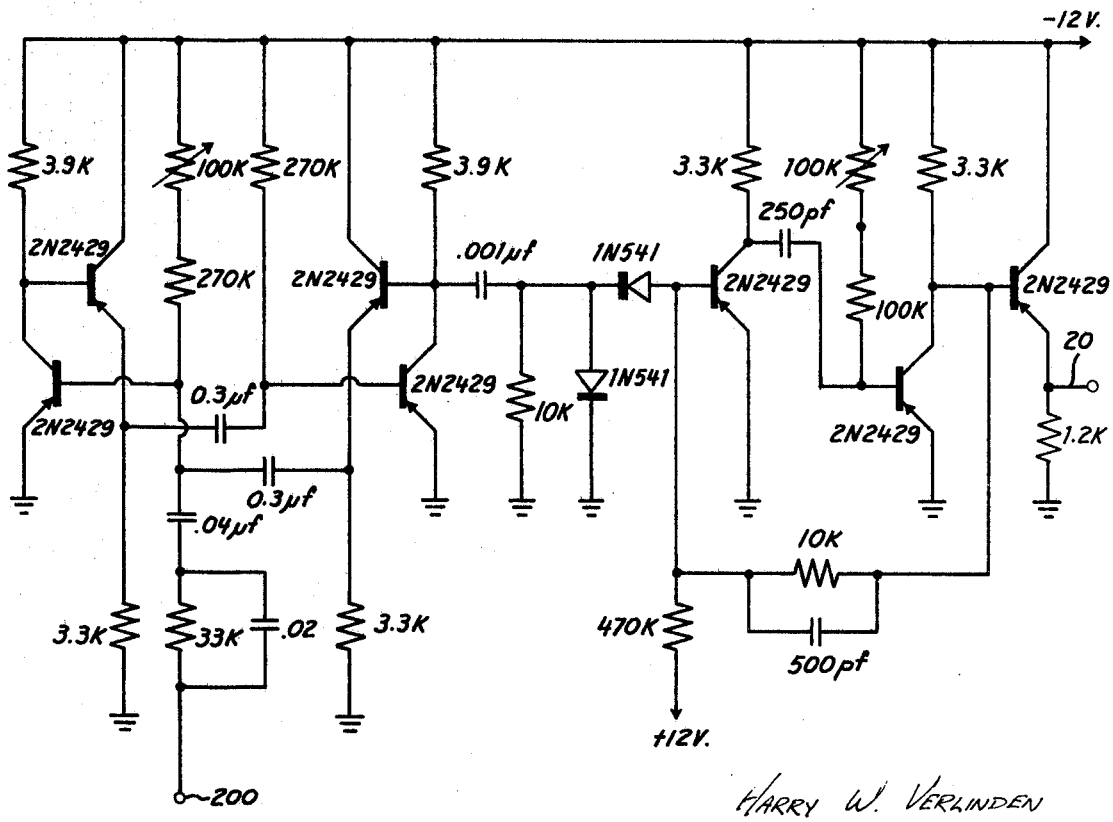

BY

PATENT AGENT

United States Patent Office 3,510,789
Patented May 5, 1970

3,510,789
METHODS AND APPARATUS FOR DETERMINING
THE RESPONSE OF AN AMPLIFIER
Harry W. Verlinden, Waterloo, Ontario, Canada, assignor
to Electrohome Limited, Kitchener, Ontario, Canada
Filed Oct. 6, 1967, Ser. No. 674,076
Int. Cl. H03f 3/10; G01r 23/00
U.S. Cl. 330—2
15 Claims

ABSTRACT OF THE DISCLOSURE

The response of an amplifier to a plurality of test signals of different frequencies falling within the bandwidth of the amplifier is determined by generating a sawtooth waveform, providing a plurality of test signal blocks at different test signal frequencies with the blocks being out of phase with respect to each other but all occurring within one sweep interval of the sawtooth waveform; providing a cathode ray tube having horizontal and vertical deflection means, supplying the sawtooth waveform to one of the deflection means, supplying the test signal blocks to the input terminal of the amplifier under test, and supplying the resultant signal appearing at the output terminal of the test amplifier to the other of the deflection means.

---

This invention relates to methods and apparatus for determining the response of an amplifier to signals of different frequencies. More specifically, this invention relates to methods and apparatus which permit the whole or any part of the response curve of an amplifier, e.g., an audio amplifier, to be viewed.

It is often desirable that it should be possible to determine the exact shape of the response curve of an amplifier or the response of an amplifier to a signal at a given frequency. This may be necessary for checking purposes, for example, or for the purpose of permitting adjustments to be made by a circuit designer in the low, middle or high frequency response of an amplifier. In accordance with this invention, methods and apparatus are provided which permit the whole or any selected portion of the response curve of an amplifier to be determined with accuracy.

In accordance with this invention, the response of an amplifier to a plurality of test signals of different frequencies falling within the bandwidth of the amplifier is determined by generating a sawtooth waveform, providing a plurality of test signal blocks at different test signal frequencies with the blocks being out of phase with respect to each other but all occurring within one sweep interval of the sawtooth waveform, providing a cathode ray tube having horizontal and vertical deflection means, supplying the sawtooth waveform to one of the deflection means, supplying the test signal blocks to the input terminal of the amplifier under test, and supplying the resultant signal appearing at the output terminal of the test amplifier to the other of the deflection means.

This invention will become more apparent from the following detailed description, taken in conjunction with the appended drawings, in which:

FIG. 1 is a block diagram of one form of apparatus that may be used in practising this invention;

FIGS. 2a to 2i inclusive are time charts in which voltage is plotted against time and which show the waveforms at various points in FIG. 1;

FIG. 3 is a block diagram of another form of apparatus which may be used in practising this invention;

FIGS. 4a to 4d inclusive are time charts of voltage against time showing the waveforms appearing at various points in FIG. 3; and FIGS. 5 to 10 inclusive are circuit diagrams of the various components shown in block form in FIG. 1.

Referring first to FIG. 1, there is provided a free running (astable) multivibrator 10 having one output terminal 11 thereof connected via a line 12 to the input terminal 13 of a one-shot (monostable) multivibrator 14. One output terminal 15 of monostable multivibrator 14 is connected via a line 16 to the input terminal 17 of an emitter follower amplifier 18. The output terminal 19 of emitter follower 18 is connected via a line 20 to lines 21 and 22. Line 21 is connected to the input terminal 23 of a sawtooth generator 24 whose output terminal 25 is connected via a line 26 to the input terminal 27 of an emitter follower amplifier 28. The output terminal 29 of emitter follower 28 is connected via a line 30 to the horizontal deflection plates 31 of the cathode ray tube 32 of an oscilloscope.

Line 22 is connected to the input terminals, 33, 34, 35, 36 and 37 of monostable multivibrators 38, 39, 40, 41 and 42 respectively. Output terminals 43, 44, 45, 46 and 47 of the aforementioned monostable multivibrators 38 to 42 respectively are connected via lines 48, 49, 50, 51 and 52 respectively to input terminals 53, 54, 55, 56 and 57 respectively of monostable multivibrators 58, 59, 60, 61 and 62 respectively. Output terminals 63, 64, 65, 66 and 67 of monostable multivibrators 58 to 62 respectively are connected via lines 68, 69, 70, 71 and 72 respectively to input terminals 73, 74, 75, 76 and 77 respectively of gated amplifiers 78, 79, 80, 81 and 82 respectively. The other input terminal 83 of gated amplifier 78 is connected via a line 84 to an audio oscillator 85 or tone or signal generator producing an output signal having a frequency, of, say, 40 Hz. The other input terminal 86 of gated amplifier 78 is connected via a line 87 to an audio signal generator 88 producing an output signal having a frequency of, say, 100 Hz. Similarly, other audio signal generators 89, 90 and 91 producing output signals having frequencies of, say, 1 kHz., 10 kHz. and 20 kHz. respectively are connected via lines 92, 93 and 94 respectively to the other input terminals 95, 96 and 97 respectively of gated amplifiers 80, 81 and 82 respectively. Gated amplifiers 78 to 82 have output terminals 98, 99, 100, 101 and 102 respectively, and these are connected together via a common line 103 that itself is connected via a line 104 to the input terminal 105 of an audio amplifier 106. The output terminal 107 of audio amplifier 106 is connected via a line 108 to the input terminal 109 of an emitter follower amplifier 110. The output terminal 111 of emitter follower 110 is connected via a line 112 to the input terminal 113 of an audio amplifier 114 whose response curve it is desired to determine. The output terminal 115 of test amplifier 114 is connected via a line 116 to the vertical deflection plates 117 of cathode ray tube 32.

The apparatus of FIG. 3 is somewhat similar to the apparatus of FIG. 1, and identical components in FIGS. 1 and 3 employ the same reference numerals. The apparatus of FIG. 3 differs from the apparatus of FIG. 1 in that line 22 is connected to one input terminal 118 of only one monostable multivibrator, namely monostable multivibrator 119. One output terminal 120 of monostable multivibrator 119 is connected via lines 121 and 122 to one input terminal 123 of another monostable multivibrator 124 and to one input terminal 125 of a gated amplifier 126 respectively. One output terminal 127 of monostable multivibrator 124 is connected via lines 128 and 129 to one input terminal 130 of a monostable multivibrator 131 and to one input terminal 132 of a gated amplifier 133 respectively. One output terminal 134 of monostable multivibrator 131 is connected via a line 135 to one input terminal 136 of a gated amplifier 137. The other input terminals 138, 139 and 140 of gated amplifiers 126, 133 and 137 respectively are connected via lines 84, 92 and 94 respectively to audio signal generators 85, 89 and 91 respectively. The output terminal 141, 142 and 143 of gated amplifiers 126, 133 and 137 respectively are commoned via a line 103, which, as in FIG. 1, is connected via a line 104 to the input terminal 105 of an audio amplifier 106.

For the sake of simplicity, cathode ray tube 32 and its deflection plates have been omitted from FIG. 3, but it will be understood that line 30 is connected to the horizontal deflection plates of the cathode ray tube, as in FIG. 1, and line 116 is connected to the vertical deflection plates of the cathode ray tube, also as in FIG. 1.

The signals on lines 22 and 30 of FIG. 3 are obtained in the same way as in FIG. 1 and by using the same apparatus as shown in FIG. 1.

The operation of the apparatus shown in FIG. 1 now will be discussed with reference to FIG. 1 and FIGS. 2a to 2i. The signal that appears on line 12 is shown in FIG. 2a and is the typical output signal of an astable multivibrator, i.e. astable multivibrator 10. The signal on line 12 is applied to monostable multivibrator 14 that produces a signal on line 16 of the type shown in FIG. 2b. As may be seen by reference to FIGS. 2a and 2b, the signal on line 16 is a series of negative pulses of short duration triggered on the negative-going edges of the positive pulses on line 12. Emitter follower 18 amplifies the signal on line 16 and provides a low impedance output. The signal appearing on line 20 and hence on lines 21 and 22 is of substantially the same shape as the signal shown in FIG. 2b. The signal on line 21 is applied to sawtooth generator 24, which produces the sawtooth waveform shown in FIG. 2c and which appears on line 26. The sawtooth waveform is amplified by emitter follower 28 and applied to horizontal deflection plates 31 of cathode ray tube 32 via line 30.

The signal on line 22 is applied to monostable multivibrator 38 which produces on line 48 the signal shown in FIG. 2d. This signal consists of positive pulses of short duration triggered on the positive-going edges of the pulses of FIG. 2b. FIG. 2e shows the output signal appearing on line 68 and which results from the application of the signal of FIG. 2d to monostable multivibrator 58. It will be seen that the signal of FIG. 2e, which is the input signal to input terminal 73 of gated amplifier 78, consists of a series of negative pulses having a pulse width A.

The signal on line 22 also is applied to monostable multivibrator 39. The components of this multivibrator are selected relative to the components of multivibrator 38 such that multivibrator 39 will produce on line 49 positive pulses of longer duration than the positive pulses produced on line 48 by monostable multivibrator 38, as may be seen by comparing FIG. 2d and 2f, FIG. 2f showing the signal appearing on line 49. This signal is applied to monostable multivibrator 59, and the resulting signal appearing on line 69 and applied to input terminal 74 of gated amplifier 79 is shown in FIG. 2g.

By comparing FIGS. 2g and 2e, it will be noted that both are a series of negative-going pulses of the same frequency but shifted in phase, with all pulses having the same pulse width, A.

The signal on line 22 also is applied to monostable multivibrator 40. The components of this multivibrator are selected relative to the components of multivibrators 38 and 39 so that the positive pulses which appear on line 50 and which are triggered on the positive-going edges of the negative pulses of FIG. 2b are of longer duration than the positive pulses of FIGS. 2d and 2f, as may be seen by comparing FIGS. 2d, 2f and 2h, FIG. 2h showing the signal that appears on line 50. The signal that appears on line 70 and which is applied to input terminal 75 of gated amplifier 80 is shown in FIG. 2i, and, like the signal of FIG. 2g, is of the same frequency as the signal of FIG. 2e but is shifted in phase with respect thereto, as well as with respect to the signal of FIG. 2g, and consists of a series of negative pulses having a pulse width A. These pulses are triggered on the negative-going edges of the positive pulses of FIG. 2h, just as the negative pulses of FIG. 2g are triggered on the negative-going edges of the positive pulses of FIG. 2f.

For the sake of simplicity the signals appearing on lines 71 and 72 have not been shown FIG. 2, but it will be understood that these signals will be of the same form as the signals of FIGS. 2e, 2g and 2i and will consist of negative pulses having a pulse width A and of the same frequency but out of phase with respect to each other and the signals of FIGS. 2e, 2g and 2i.

The signal of FIG. 2e is applied to input terminal 73 of gated amplifier 78 and turns this amplifier on for the duration of each negative pulse of the signal of FIG. 2e, thereby permitting a 40 Hz. signal to appear at output terminal 98. In other words, for the duration of each negative pulse of the signal of FIG. 2e, there will appear at output terminal 98 what could be referred to as a block of 40 Hz. audio signal. Similarly, for the duration of each negative pulse of the signal of FIG. 2g, there will appear at output terminal 99 of gated amplifier 79 a block of 100 Hz. audio signal, and for the duration of each negative pulse of the signal of FIG. 2i, there will appear at output terminal 100 of gated amplifier 80 a block of 1 kHz. audio signal. There also will appear successively at output terminals 101 and 102 audio signal blocks of 10 kHz. and 20 kHz. respectively. These audio signal blocks are applied sequentially via lines 103 and 104 to input terminal 105 of audio amplifier 106, are further amplified by emitter follower amplifier 110 and then are applied to input terminal 113 of test amplifier 114, the output signal of test amplifier 114 being applied to vertical deflection plates 117 of cathode ray tube 32. The output signal of test amplifier 114 will clearly show the response of the test amplifier to frequencies of 40 Hz, 100 Hz., 1 kHz., 10 kHz. and 20 kHz., and the response of the amplifier to signals at these various frequencies will be seen all at one time on the screen of cathode ray tube 32, because the sequential negative pulses applied to input terminals 73 to 77 of gated amplifiers 78 to 82 respectively all occur during one sweep or trace interval of the sawtooth waveform of FIG. 2c, i.e., within the period $1/f_1$ where $f_1$ is the frequency of the sawtooth waveform and assuming the retrace interval to be very short compared to the sweep time of the sawtooth waveform.

It should be appreciated that if it is desired to determine the response of amplifier 114 to other audio frequencies, it is only necessary to add to the apparatus of FIG. 1 two additional monostable multivibrators, another gated amplifier and another audio frequency tone generator for each frequency for which it is desired to determine the response of amplifier 114.

While the negative pulses of FIGS. 2e, 2g and 2i are shown as having the same pulse width, this is not essential, and the pulse widths may vary. It also is not essential that overlapping in time of the pulses of FIGS. 2e, 2g and 2i be avoided. These pulses could overlap in time as long as complete overlapping is avoided.

While amplifier 114 has been considered an audio amplifier, obviously it could be video amplifier or any other type of amplifier, and tone generators 85 to 91 inclusive should be selected to provide frequencies within the bandwidth of the test amplifier.

FIG. 5, strictly by way of example, is a circuit diagram of astable multivibrator 10, monostable multivibrator 14 and emitter follower 18. When it is desired that astable multivibrator 10 operate at a frequency that is a sub-multiple of one of the audio test signals, say the 40 Hz. signal, a 40 Hz. signal from audio signal generator 85 may be applied to sync input terminal 200.

The circuit diagram of a suitable sawtooth generator 25 and emitter follower 28 is shown in FIG. 6.

The five audio frequency tone generators 85, 88, 89, 90 and 91 may be constructed as shown in FIG. 7. The following table lists the values that certain capacitors of these tone generators may have to give output signals of 40 Hz., 100 Hz., 1 kHz., 10 kHz, and 20 kHz.

|         | C1        | C2        | C3        | C4      | C5       | C6       | C7      |
|---------|-----------|-----------|-----------|---------|----------|----------|---------|
| 40 Hz   | 0.18 µf.  | 0.18 µf.  | 0.18 µf.  | 50 µf.  | 4 µf.    | 4 µf.    | 25 µf.  |
| 100 Hz  | .068 µf.  | .068 µf.  | .068 µf.  | 25 µf.  | 0.4 µf.  | 0.4 µf.  | 25 µf.  |
| 1 kHz   | .0068 µf. | .0068 µf. | .0068 µf. | 10 µf.  | 0.1 µf.  | 0.1 µf.  | 10 µf.  |
| 10 kHz  | 680 pf.   | 680 pf.   | 680 pf.   | 4 µf.   | .01 µf.  | .01 µf.  | 10 µf.  |
| 20 kHz  | 330 pf.   | 330 pf.   | 330 pf.   | 4 µf.   | .01 µf.  | .01 µf.  | 10 µf.  |

FIG. 8, strictly by way of example, is a circuit diagram of various pairs of monostable multivibrators 38, 58; 39, 59, 40, 60; 41, 61; and 42, 62. The following table lists the various values that capacitor C8 should have for the various audio test signal frequencies.

| .020 µf. | 40 Hz. |
| .02 µf.  | 100 Hz. |
| .037 µf. | 1 kHz. |
| .047 µf. | 10 kHz. |
| .068 µf. | 20 kHz. |

Figure 1:
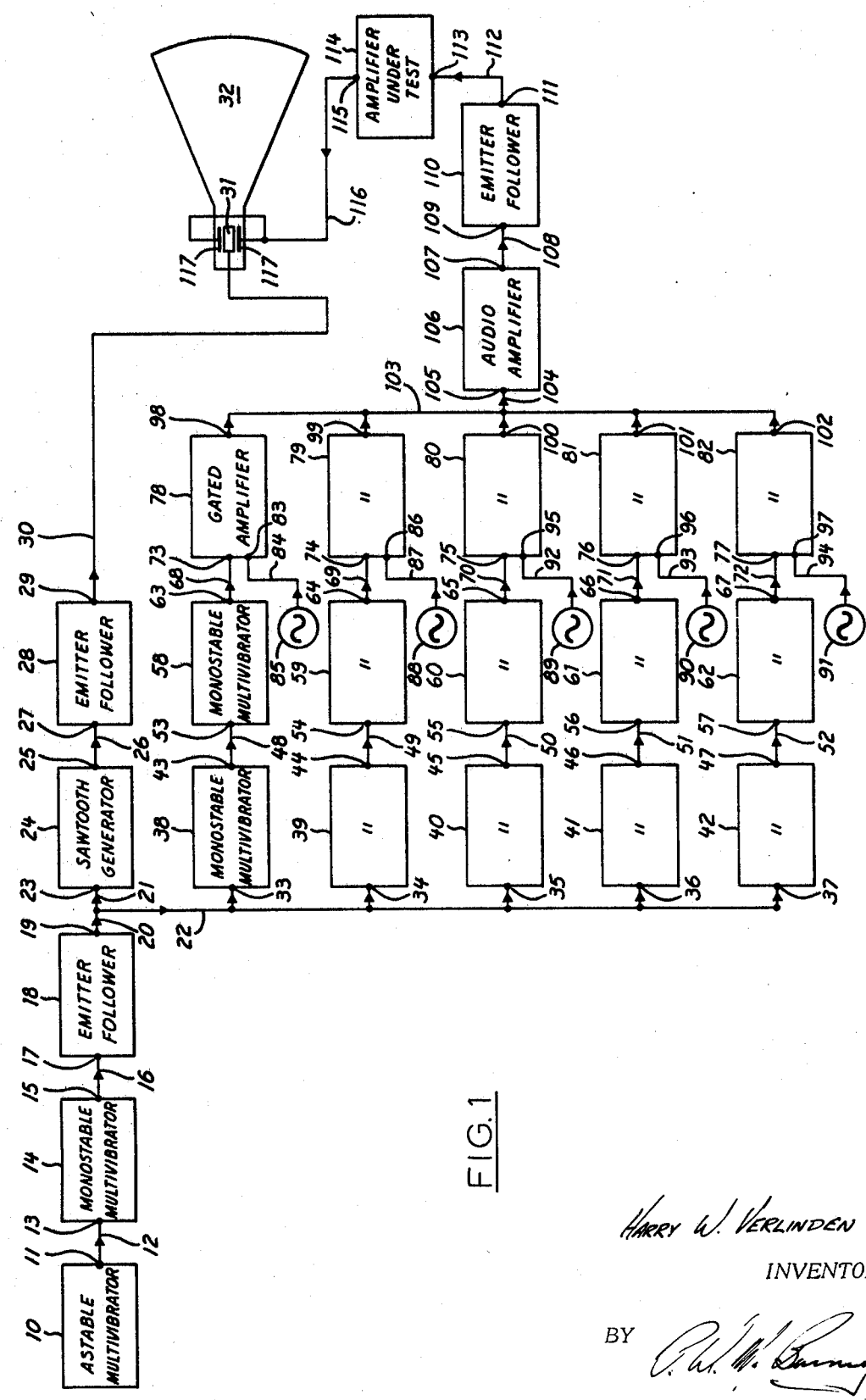
Figure 3:
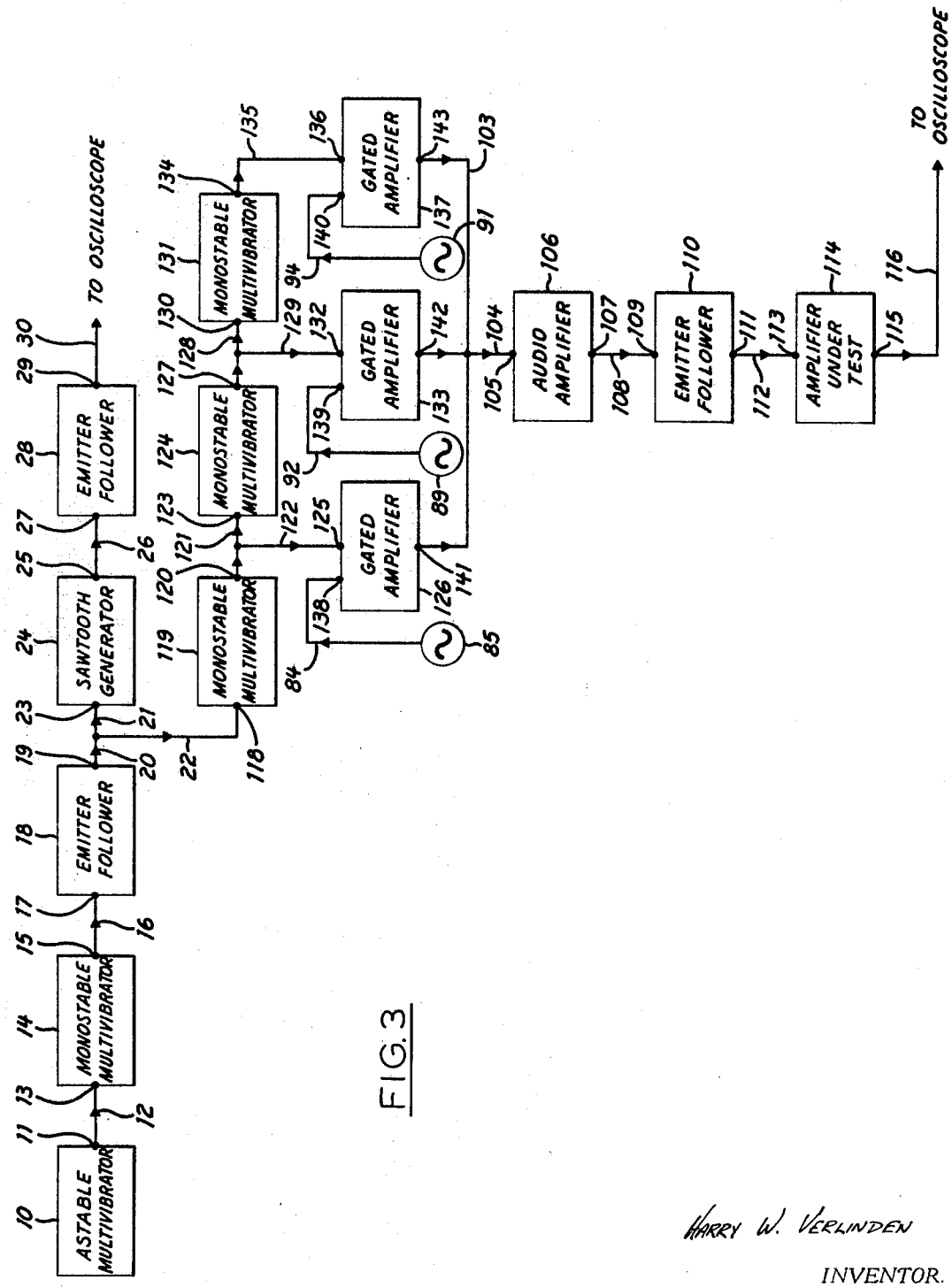
Figure 6:
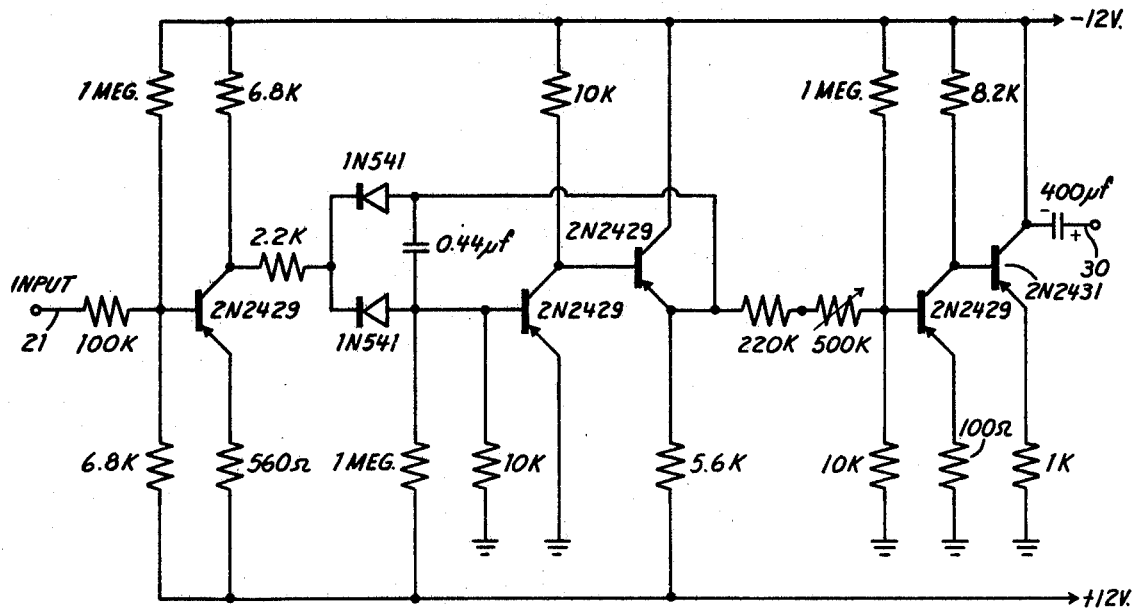
Figure 7:
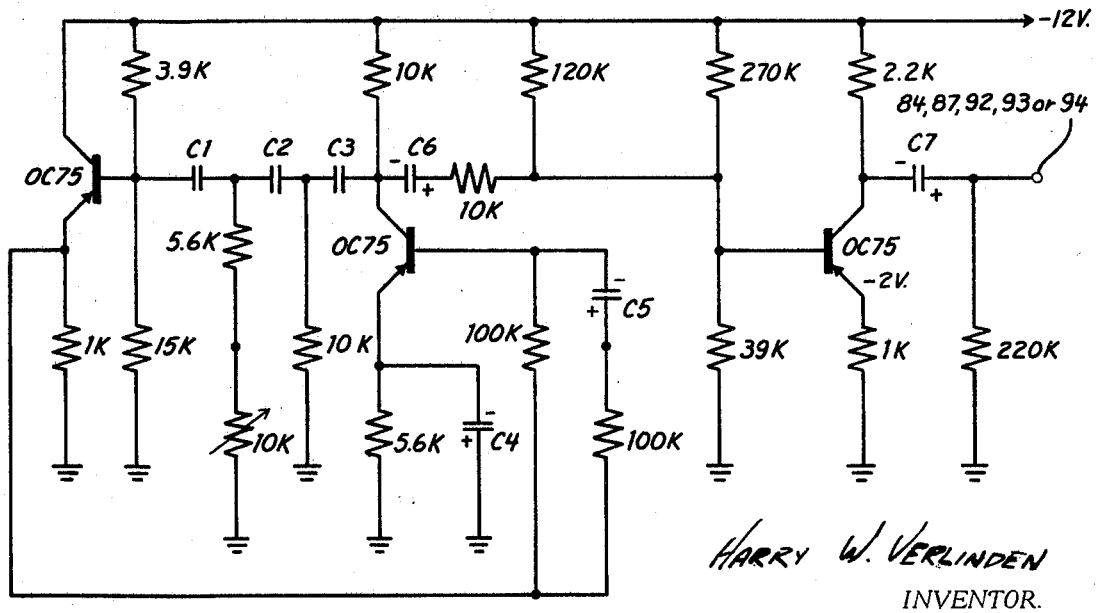
Figure 8:
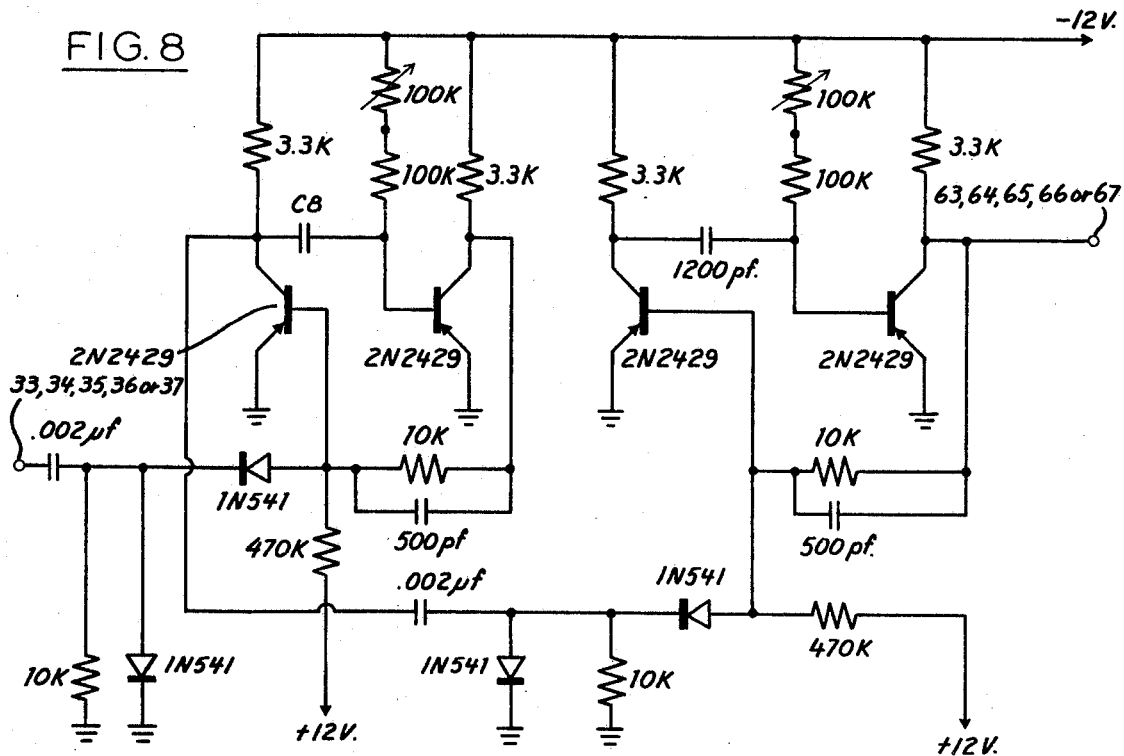
Figure 9:
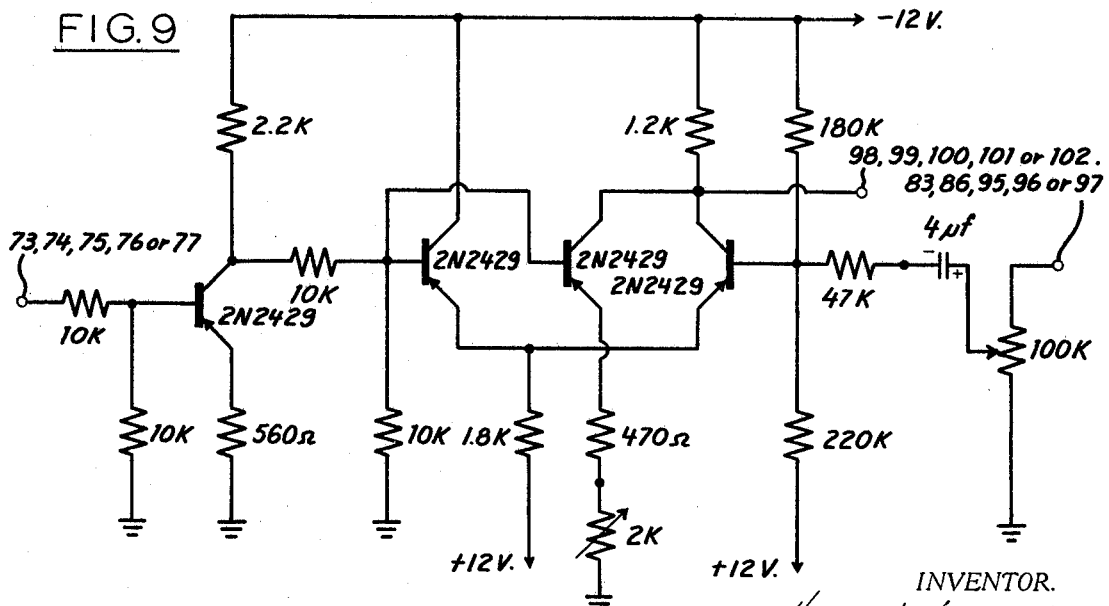
FIG. 9 is a circuit diagram showing one form of any of gated amplifiers 78 to 82 inclusive.
Figure 10:
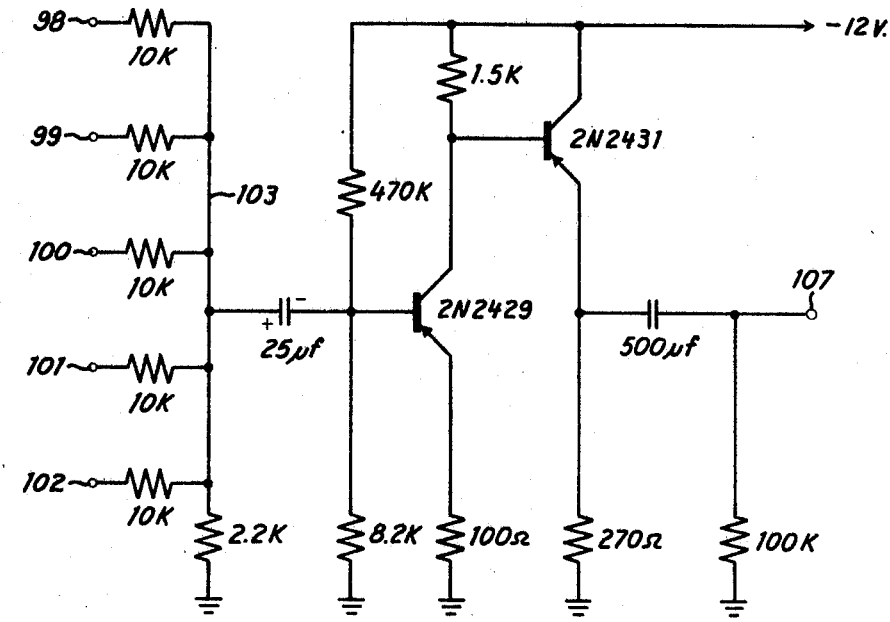
FIG. 10 is a circuit diagram showing one form of audio amplifier 106.

The apparatus of FIG. 3 is somewhat simpler than the apparatus of FIG. 1 in that it employs only one monostable multivibrator for each audio test frequency, whereas the apparatus of FIG. 1 requires two monostable multivibrators for each audio test frequency.

The signal appearing on line 22 of FIG. 3 is shown in FIG. 4a. This signal is the same as the signal of FIG. 2b and consists of a series of negative pulses of relatively short duration. This signal is applied to input terminal 118 of monostable multivibrator 119, and the output signal at output terminal 120 of monostable multivibrator 119 is shown in FIG. 4b. This signal is a series of positive pulses triggered on the negative-going edges of the negative pulses of FIG. 4a. The signal of FIG. 4b is applied to input terminal 123 of monostable multivibrator 124 which produces the signal shown in FIG. 4c at its output terminal 127. This signal is the same as the signal of FIG. 4b but shifted in phase with respect thereto and consists of positive pulses triggered on the negative-going edges of the positive pulses of FIG. 4b. Similarly, the signal produced at output terminal 134 of monostable multivibrator 131 is a series of positive pulses triggered on the negative-going edges of the positive pulses of FIG. 4c and is shown in FIG. 4d. While the pulse width of the signals of FIGS. 4b, 4c and 4d are the same, this is not essential, and the pulse widths of these signals could vary. The signals of FIGS. 4b, 4c and 4d are applied to input terminals 122, 132 and 136 respectively, thus, permitting sequential blocks of 40 Hz., 1 kHz. and 20 kHz. audio signals to be delivered to test amplifier 114. The sequentially occurring positive pulses of FIGS. 4b, 4c and 4d occur within one cycle of the sawtooth wave appearing on line 30, so that the response of amplifier 114 to each of the aforementioned audio frequencies can be viewed at one time on the cathode ray tube of an oscilloscope. As in the case of the apparatus of FIG. 1, the positive pulses of FIGS. 4b to 4d may overlap in time, but complete overlapping should be avoided.

Figure 2:
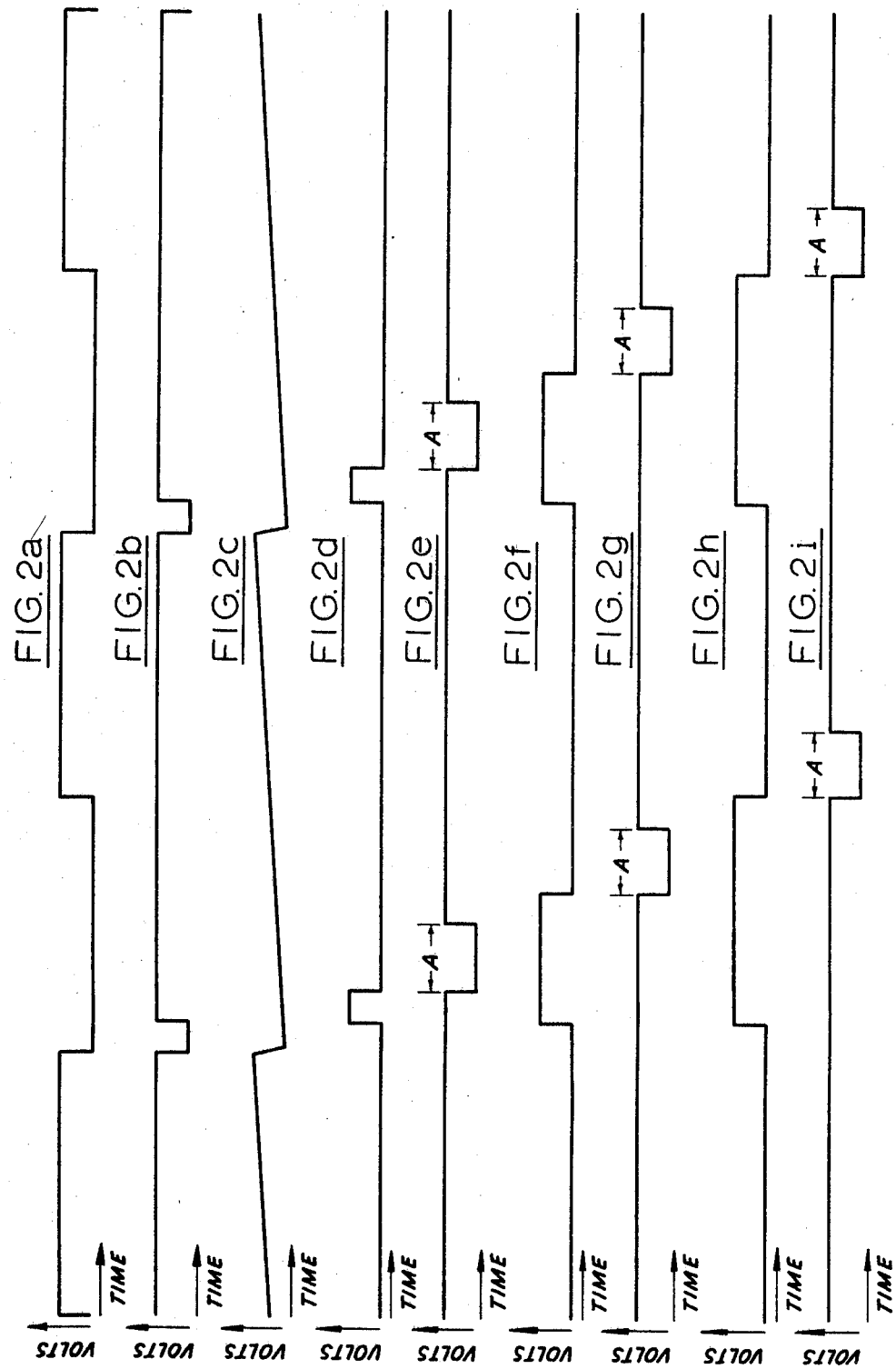

The frequency of the output signal of astable multivibrator 10, i.e., the frequency of the signal shown in FIG. 2a, may vary within wide limits. In general, if the frequency of the signal of FIG. 2a is sufficiently low that at least one full cycle of the lowest frequency test signal will be displayed on cathode ray tube 32, then it is permissible for the frequency of the signal of FIG. 2a to be a sub-multiple (a whole number obtained by dividing a higher number by a whole number) of the frequency of any of the test signals. However, if the frequency of the signal of FIG. 2a is such that less than one full cycle of the lowest frequency test signal will be displayed on cathode ray tube 32, then it is necessary that the frequency of the signal of FIG. 2a be other than a multiple or sub-multiple of the lowest frequency test signal.

Preferably the frequency of the signal of FIG. 2a should be, say, of the order of 20 Hz. or more, but this may result in problems when low frequency audio test signals are employed with test amplifiers having poor transient response. In this respect, if only a part of a cycle of the lowest frequency test signal is displayed, then, at the end of that test signal block, the voltage that is being applied to the test amplifier may be relatively large. The sudden cutting off at this point of the gated amplifier and hence the test signal to the test amplifier may result in a transient response that will appear as a peak on the cathode ray tube of the oscilloscope, this being due to energy stored, for example, in the output transformer of the amplifier under test. This problem can be overcome by supplying the higher frequency test signal blocks before the lower frequency test signal blocks, so that there will be appreciable recovery time between the application of a low frequency block to the test amplifier and the application of a high frequency block to the amplifier.

It should be appreciated that the apparatus of FIGS. 1 and 3 is representative of only several different forms of apparatus which can be used in practising this invention. Many variations are possible. Merely by way of example, monostable multivibrator 14 could be eliminated and replaced by an integrator producing an output signal in the form of positive pulses triggered on the positive-going edges of the positive pulses of FIG. 2a and negative pulses triggered on the negative-going edges of the positive pulses of FIG. 2a. This signal could be applied to a diode, which would eliminate the positive pulses, leaving a signal somewhat similar to the signal to FIG. 2b in the form of a series of negative pulses.

In order to display the response curve of test amplifier 114, the signals on lines 30 and 116 may be applied via conventional deflection circuitry to the horizontal and vertical deflection plates of cathode ray tube 32 or to the horizontal and vertical deflection coils of a cathode ray tube employing electromagnetic deflection. The latter alternative would be permissible only over a limited range of test signal frequencies.

While preferred embodiments of this invention have been disclosed herein, those skilled in the art will appreciate that changes and modifications may be made therein without departing from the spirit and scope of this invention as defined in the appended claims.

What I claim as my invention is:

1. Apparatus for determining the response of an amplifier to a plurality of test signals of different frequencies falling within the bandwidth of said amplifier comprising: a sawtooth waveform generator producing a sawtooth waveform having a frequency $f_1$, a period $1/f_1$ a sweep interval during each period and a retrace interval during each period; a plurality of gating signal generators each producing a gating signal that is shifted in phase with respect to the gating signal of each other of said gating signal generators and all of which gating signals occur at least once during one sweep interval of said sawtooth waveform; a plurality of test signal generators producing test signals of different frequencies within the bandwidth of said amplifier; a plurality of gates each having first and second input terminals and an output terminal and each of a type that provides at said output terminal thereof an output signal in the form of at least a part of one cycle of one of said test signals in response to said one test signal and one of said gating signals being supplied at a coinciding time to said first and second input terminals thereof respectively; means for supplying different ones of said gating signals to different ones of said second input terminals of said gates; means for supplying different frequency ones of said test signals to different ones of said first input terminals of said gates; an amplifier whose response is to be determined and having input and output terminals; means for supplying said output signals of said gates to said input terminal of said amplifier to produce an output signal at said output terminal of said amplifier; a cathode ray tube having vertical and horizontal deflection means; means for supplying said sawtooth waveform to one of said deflection means; and means for supplying said output signal of said amplifier to the other of said deflection means.

2. Apparatus according to claim 1 wherein said gating signal generators are monostable multivibrators.

3. Apparatus according to claim 1 wherein said frequency $f_1$ is other than a multiple or sub-multiple of the frequency of the lowest frequency one of said test signals and wherein said lowest frequency and said frequency $f_1$ are so related that less than one full cycle of said lowest frequency test signal will be displayed on said cathode ray tube.

4. Apparatus according to claim 1 wherein said frequency $f_1$ is a sub-multiple of the frequency of one of said test signal frequencies and the frequency of the lowest frequency one of said test signals and said frequency $f_1$ are so related that at least one full cycle of said lowest frequency test signal will be displayed on said cathode ray tube.

5. Apparatus according to claim 4 wherein all of said test signal frequencies other than the highest of said test signal frequencies are sub-multiples of said highest test signal frequency.

6. Apparatus according too claim 1 including first signal generating means producing a first signal having said frequency $f_1$; means for supplying said first signal to said sawtooth waveform generator to produce said sawtooth waveform; and means for supplying said first signal to at least one of said gating signal generators.

7. Apparatus according to claim 6 wherein said first signal generating means comprise an astable multivibrator producing an output signal; a monostable multivibrator; and means for supplying said output signal of said astable multivibrator to said monostable multivibrator.

8. Apparatus according to claim 1 including first signal generating means producing a first signal having said frequency $f_1$; means for supplying said first signal to said sawtooth waveform generator to produce said sawtooth waveform; and means for supplying said first signal to each of said gating signal generators to produce said gating signals.

9. Apparatus according to claim 7 wherein each of said gating signal generators comprises first and second monostable multivibrators each having an input terminal and an output terminal and means connecting said output terminal of said first monostable multivibrator and said input terminal of said second monostable multivibrator, said means for supplying said first signal to each of said gating signal generators being connected to said input terminals of said first monostable multivibrators, and said means for supplying said output signals of said gates to said input terminal of said amplifier being connected to said output terminals of said second multivibrators.

10. Apparatus according to claim 1 including first signal generating means producing a first signal having said frequency $f_1$; means for supplying said first signal to said sawtooth waveform generator to produce said sawtooth waveform; means for supplying said first signal to one of said gating signal generators to produce said gating signal thereof; and means for supplying said gating signal of all but one of said gating signal generators to a different one of said gating signal generators to produce said gating signals thereof.

11. Apparatus according to claim 10 wherein each of said gating signal generators is a monostable multivibrator having an input terminal and an output terminal, each of said output terminals of all but one of said monostable multivibrators being connected to said input terminal of a different one of said monostable multivibrators.

12. A method for determining the response of an amplifier to a plurality of test signals of different frequencies falling within the bandwidth of said amplifier that comprises: generating a sawtooth waveform having a frequency $f_1$; providing a plurality of test signal blocks at different test signal frequencies with said blocks being out of phase with respect to each other but all occurring within one sweep interval of said sawtooth waveform; providing a cathode ray tube having horizontal and vertical deflection means; supplying said sawtooth waveform to one of said deflection means; supplying said test signal blocks to the input terminal of an amplifier having an input terminal and an output terminal; and supplying the resultant signal appearing at said output terminal to the other of said deflection means.

13. The method according to claim 12 wherein said frequency $f_1$ is other than a multiple or sub-multiple of the frequency of the lowest frequency one of said test signals and wherein said lowest frequency and said frequency $f_1$ are so related that less than one full cycle of said lowest frequency test signal will be displayed on said cathode ray tube.

14. The method according to claim 12 wherein said frequency $f_1$ is a sub-multiple of the frequency of one of said test signal frequencies and the frequency of the lowest frequency one of said test signals and said frequency $f_1$ are so related that at least one full cycle of said lowest frequency test signal will be displayed on said cathode ray tube.

15. The method according to claim 14 wherein all of said test signal frequencies other than the highest of said test signal frequencies are sub-multiples of said highest test signal frequency.

References Cited

UNITED STATES PATENTS

| | | | |
|---|---|---|---|
| 2,215,197 | 9/1940 | Sherman | 324—57 X |
| 2,534,957 | 12/1950 | Delvaux | 324—57 |
| 2,905,886 | 9/1959 | Hupert et al. | 324—57 |

NATHAN KAUFMAN, Primary Examiner

U.S. Cl. X.R.

330—12, 24, 30, 124